May 6, 1924. 1,493,035
C. GUERITEY
SOLDERING MACHINE
Filed Nov. 27, 1922 4 Sheets-Sheet 1
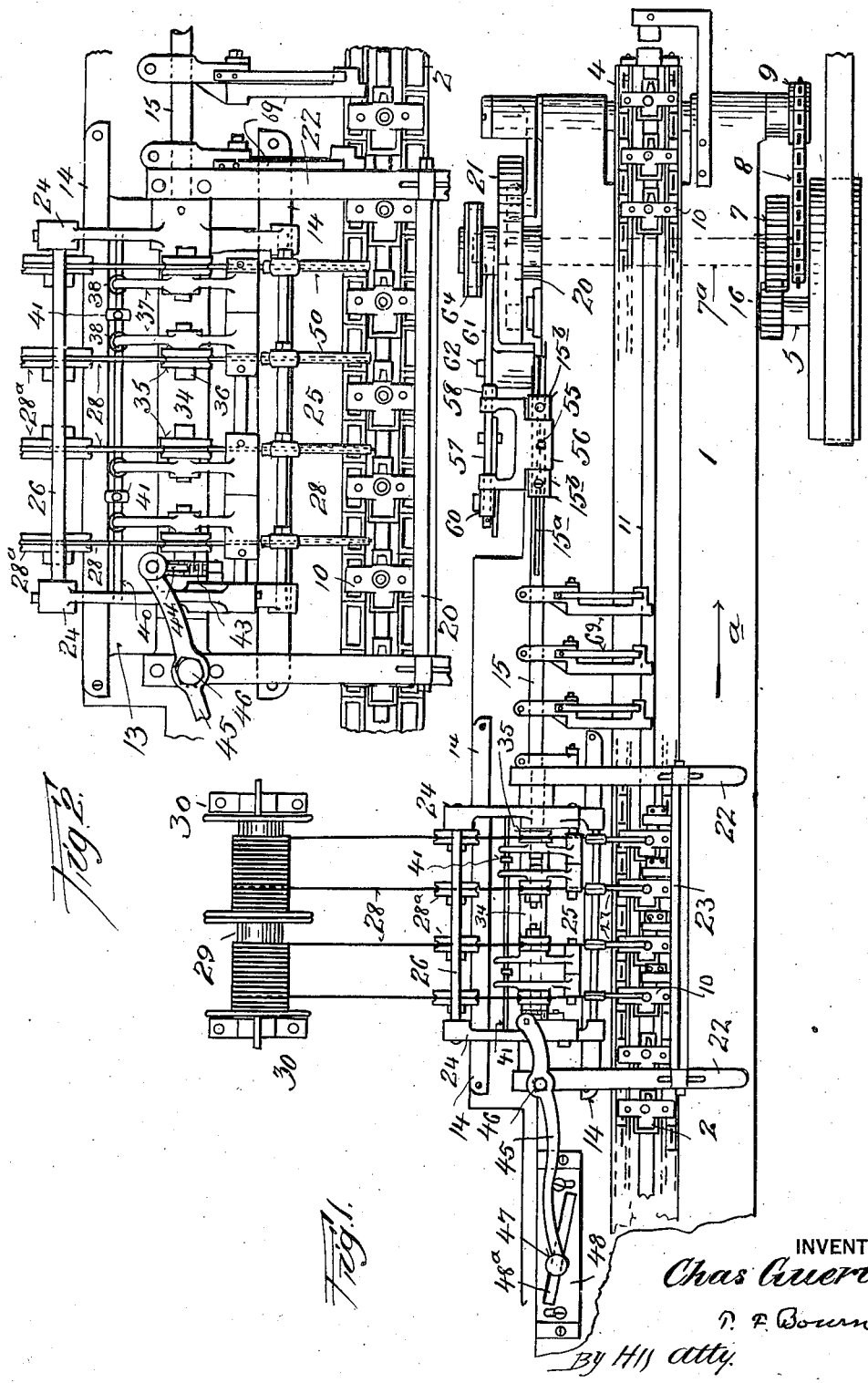
INVENTOR
Chas Gueritey
P. F. Bourne
By His atty.

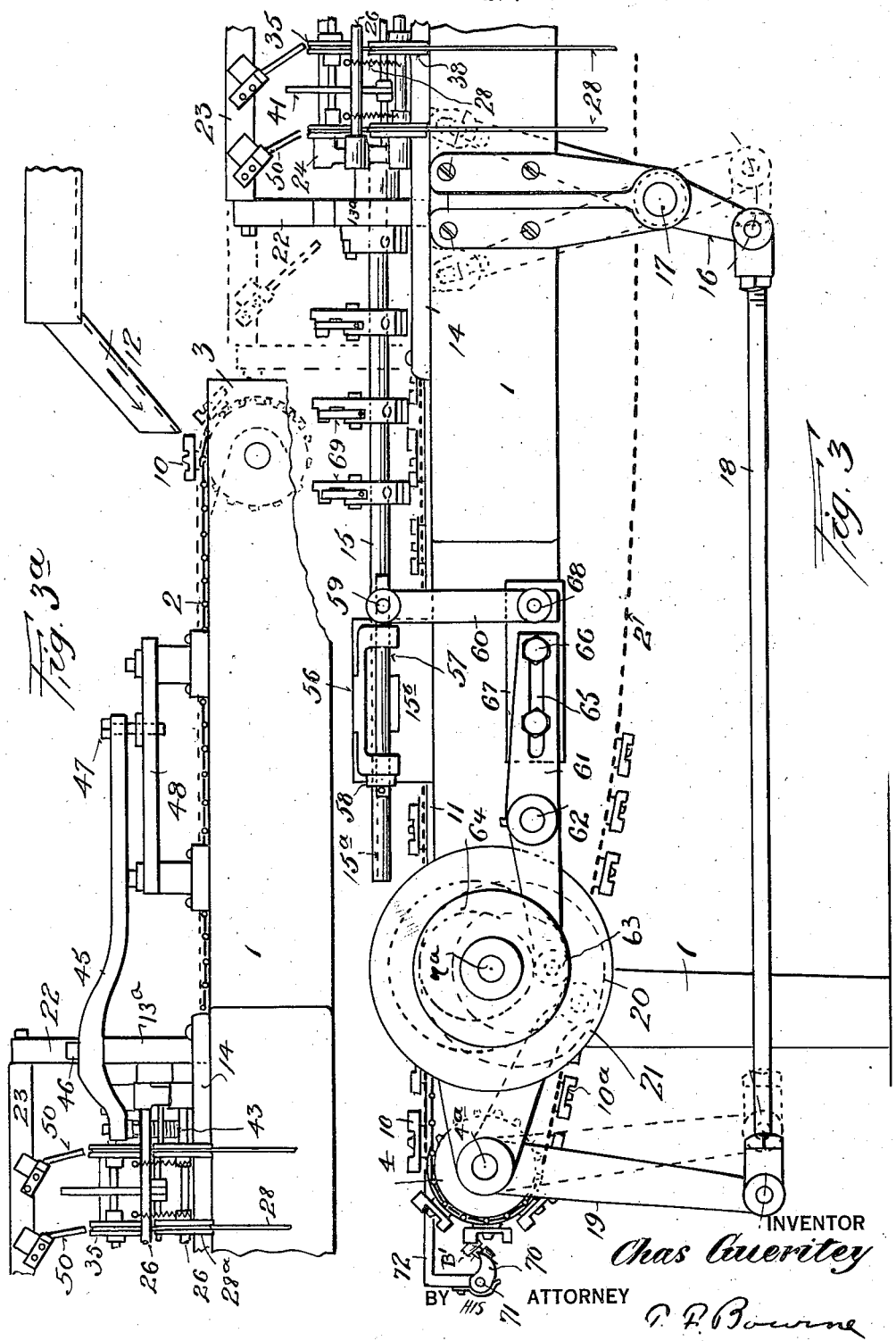

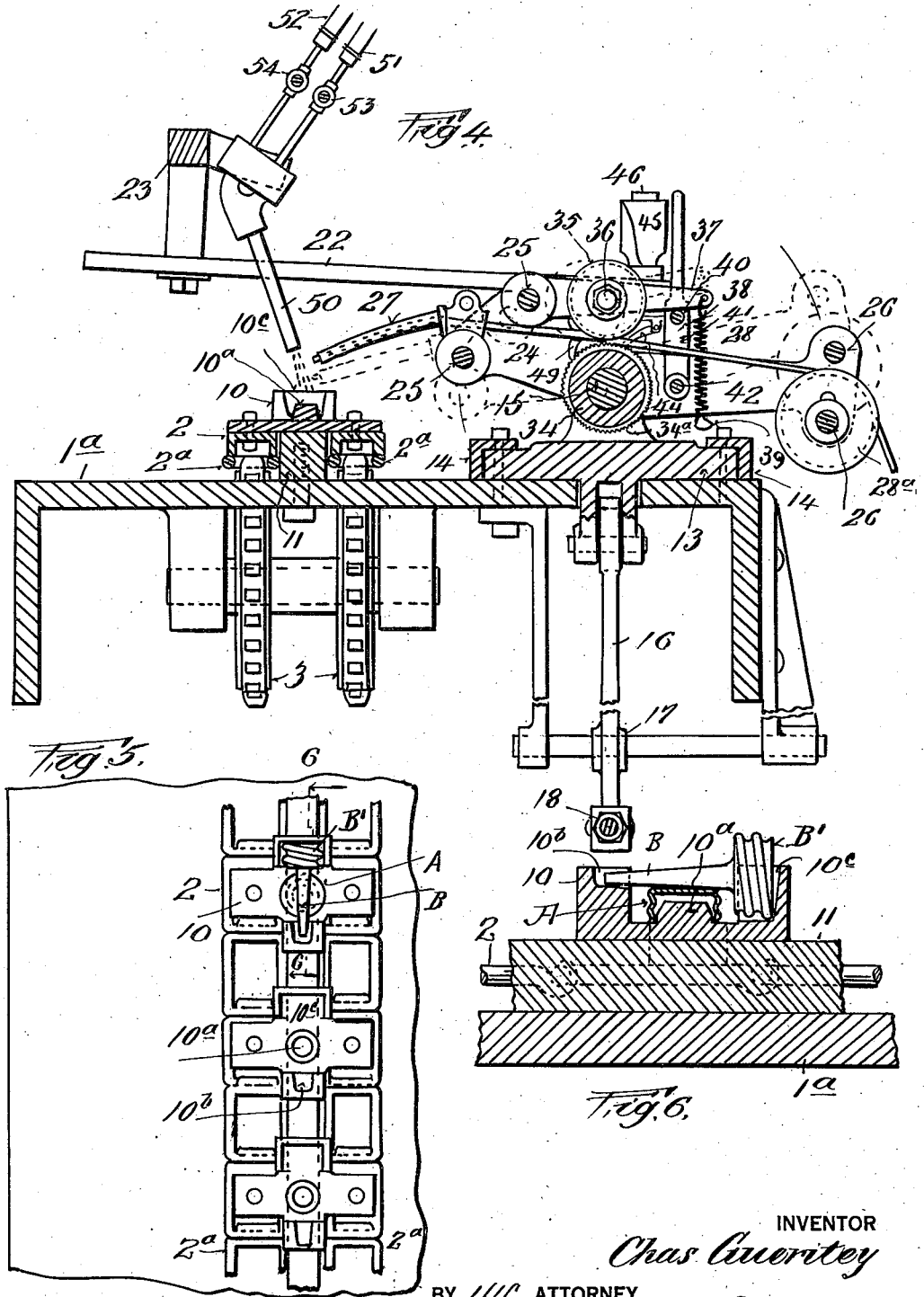

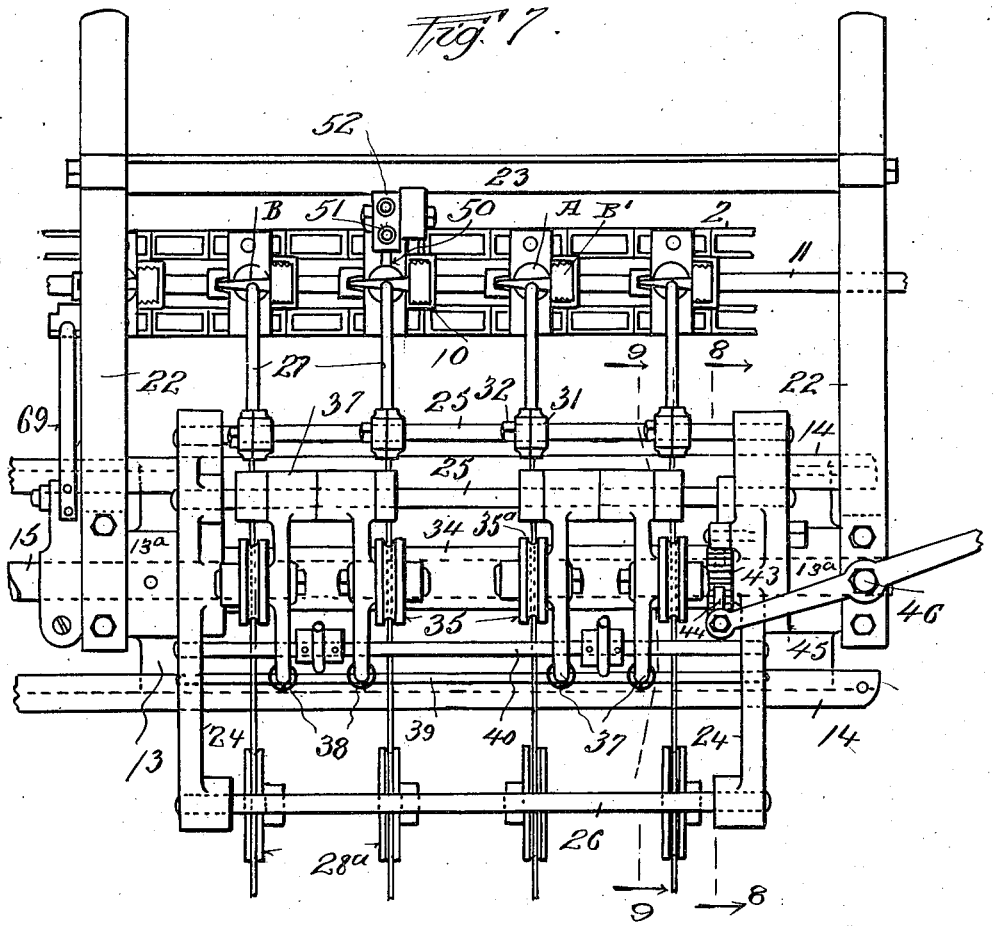
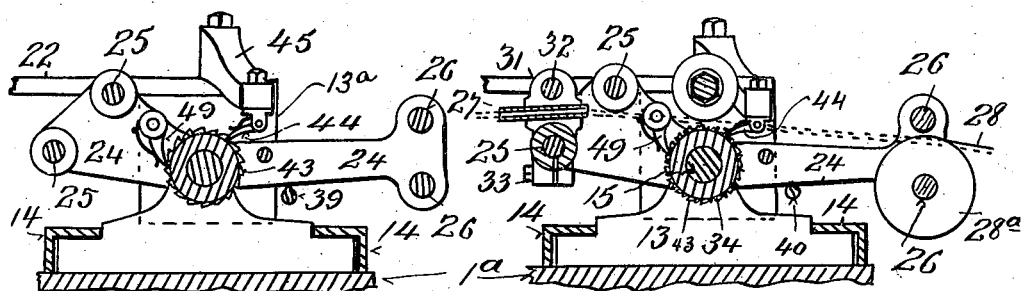

Patented May 6, 1924.

1,493,035

UNITED STATES PATENT OFFICE.

CHARLES GUERITEY, OF PASSAIC, NEW JERSEY, ASSIGNOR TO PASSAIC METAL WARE COMPANY, OF PASSAIC, NEW JERSEY, A CORPORATION OF NEW JERSEY.

SOLDERING MACHINE.

Application filed November 27, 1922. Serial No. 603,608.

*To all whom it may concern:*

Be it known that I, CHARLES GUERITEY, a citizen of the United States, and resident of Passaic, in the county of Passaic and State of New Jersey, have invented certain new and useful Improvements in Soldering Machines, of which the following is a specification.

My invention relates to improvements in means for soldering articles together, and in the particular embodiment of my invention herein set forth I provide a machine adapted to solder threaded caps to the sides of spouts adapted to be attached to containers, such as tin cans.

An object of my invention is to provide means to automatically solder articles together while they progress through the machine, so that the feeding of the articles to the soldering devices may be continuous. In the form illustrated the soldering devices travel with the articles to be soldered for a suitable distance and then return to an initial position and again travel with other articles to be soldered, and so on continuously.

My invention comprises novel details of improvement and combinations of parts that will be more fully hereinafter set forth and then pointed out in the claims.

Fig. 1 is a plan view of a portion of a soldering machine embodying my invention;

Fig. 2 is an enlarged detail of part of Fig. 1, parts being omitted;

Figs. 3 and 3ª, read together, represent a side view of the machine looking from the upper side of Fig. 1;

Fig. 4 is a detail cross section;

Fig. 5 is an enlarged detail plan view, illustrating the conveyor for articles to be soldered;

Fig. 6, is an enlarged section on line 6, 6, in Fig. 5;

Fig. 7 is an enlarged plan view of soldering devices;

Fig. 8 is a section on line 8, 8 in Fig. 7;

Fig. 9 is a section on line 9, 9 in Fig. 7.

Similar numerals of reference indicate corresponding parts in the several views.

The main frame 1 of the machine may be of any suitable construction, shown having a table-like top 1ª over which a conveyor 2 for the articles to be soldered is adapted to travel. The conveyor is shown in endless chain-like form, comprising two parallel chains 2ª spaced apart and carried by pairs of sprocket wheels, 3, 4 journaled upon opposite ends of the machine. A drive shaft 5 operates sprocket wheels by means of gearing indicated at 6, 7, 8 and 9 (Fig. 1), for continuously propelling the conveyor. The conveyor is provided with receivers 10, secured to corresponding chain links, adapted to support the articles to be soldered, which receivers are shown adapted to slide upon a guide rail 11 supported upon the frame top 1ª. In the example illustrated caps A are to be soldered to the sides of spouts B. The receivers are shown provided with projections 10ª to receive and retain the caps A, and the receivers are also shown provided with seats or recesses 10ᵇ, 10ᶜ respectively adapted to receive the tips of the spouts and the threaded heads or caps B¹ thereof, (Figs. 6 and 7). The construction described is such that the spouts will be mounted in the receivers so as to extend lengthwise of the conveyor.

The caps A may be fed to the receivers of the conveyor manually, or by means of a chute 12 down which the caps may slide to the receivers, and the spouts B may be applied manually in the receivers, over the caps therein, in position illustrated in Fig. 6.

When the caps and spouts are in the receivers of the conveyor melted solder is to be applied upon the spouts and caps to solder them together. In the example illustrated I provide four sets of soldering devices all operating simultaneously, whereby solder may be applied to four caps and spouts simultaneously as the conveyor travels. A reciprocating member 13 is slidably guided upon the frame top 1ª by means of spaced guides 14 secured to said top, which member carries soldering devices. A shaft 15 is journaled in brackets 13ª on 13 for operating the soldering devices. For reciprocating slide member 13 I have shown a rock arm 16 pivotally supported upon the main frame at 17, (Figs. 3 and 4), said arm being pivotally connected by a link 18 with a crank arm 19 journaled upon shaft 4ª, which crank arm is cooperative with a cam 20, shown in the form of a suitable groove in one face of a cam taneously, it will be understood that the machine may be organized to solder together caps and spouts in single pairs by providing a single guide 27 and a single companion burner, or any desired number of pairs of caps and spouts may be soldered together simultaneously, other than the four before referred to, by providing a desired number of guides 27 and associate burners 50.

My invention is not limited to soldering caps and spouts nor to the details of construction and arrangement of parts set forth, as the same may be varied, within the scope of the appended claims, without departing from the spirit of my invention.

Having now described my invention what I claim is:

1. A soldering machine comprising means to propel articles to be soldered, a reciprocative member, soldering devices carried by said member, and means to move the member and the soldering devices from an initial position in the direction of movement of and with the first named means for soldering said articles and to move the member and the soldering devices reversely to said initial position at a greater speed than the propelling means.

2. A soldering machine comprising means to propel articles to be soldered, a reciprocative member, soldering devices carried by said member including means to feed solder to said articles and means to melt the solder upon the articles, and means to propel the member to move the soldering devices from an initial position in the direction of movement of and with said propelling means while the solder is being melted on said articles and to move said member and soldering devices to said initial position.

3. A soldering machine comprising means to propel articles to be soldered, a reciprocative member, soldering devices carried by said member including one or more guides and heating means carried by said member to melt the solder upon said articles, means to feed the member and the soldering devices from an initial position in the direction of movement of and with said propelling means and to return the member and the soldering devices to said initial position, and means to feed the solder for said articles while the soldering devices are returning to said initial position.

4. A soldering machine comprising means to propel articles to be soldered, a reciprocative member, soldering devices carried by said member including one or more guides and heating means carried by said member to melt the solder upon said articles, means to feed the soldering devices from an initial position in the direction of movement of and with said propelling means and to return the member and the soldering devices to said initial position, means to move said guide or guides from the zone of the heating means during travel of the soldering devices toward the initial position, and means to feed solder from said guide or guides during the last named movement of the feeding means.

5. A soldering machine comprising means to propel articles to be soldered, a reciprocative member adapted to move with relation to said propelling means, means to move said member in one direction synchronously with said propelling means and in a reverse direction at a speed greater than said propelling means, soldering devices, and means to melt solder carried by said member to travel therewith.

6. A soldering machine comprising means to propel articles to be soldered, a reciprocative member adapted to move with relation to said propelling means, means to move said member in one direction synchronously with said propelling means and in a reverse direction at a speed greater than said propelling means, soldering devices, means to melt solder carried by said member to travel therewith, and means to feed solder while said member is traveling in one direction.

7. A soldering machine comprising means to propel articles to be soldered, a reciprocative member adapted to move with relation to said propelling means, means to move said member in one direction synchronously with said propelling means and in a reverse direction at a speed greater than said propelling means, soldering devices, means to melt solder carried by said member to travel therewith, solder guiding means, means to move said guiding means toward and from the zone of the heating means with respect to the articles to be soldered, and means to feed solder while the soldering devices travel in the last named direction.

8. A soldering machine comprising means to propel articles to be soldered, a reciprocative member adapted to be moved in opposite directions with relation to the travel of the propelling means, means to move said member synchronously with the travel of the propelling means and reversely thereto at a greater speed than the propelling means, solder guiding means carried by said member, means carried by said member to feed said solder to the articles to be soldered, and means to melt solder with respect to said articles during travel of said propelling means and said member.

9. A soldering machine comprising means to propel articles to be soldered, a reciprocative member adapted to be moved in opposite directions with relation to the travel of the propelling means, means to move said member synchronously with the travel of the propelling means and reversely thereto at a greater speed than the propelling means, solder guiding means carried by said member, means carried by said member to feed said solder to the articles to be soldered, means to melt solder with respect to said articles during travel of said propelling means and said member, and means to move said guiding means toward and from the zone of the heating means.

10. A soldering machine comprising means to propel articles to be soldered, a reciprocative member adapted to travel with relation to said propelling means, means to move said member in opposite directions, a frame carried by said member and provided with solder guiding means, a solder feeding roll carried by said member, means to operate said roll, and means to melt the solder over said articles.

11. A soldering machine comprising means to propel articles to be soldered, a reciprocative member adapted to travel with relation to said propelling means, means to move said member in opposite directions, a frame carried by said member and provided with solder guiding means, a solder feeding roll carried by said member, means to operate said roll, means to melt the solder over said articles, and means to rock said frame to present solder from the guiding means to and from the zone of the heating means.

12. A soldering machine comprising means to propel articles to be soldered, a reciprocative member adapted to travel with relation to said propelling means, means to move said member in opposite directions, a frame carried by said member and provided with solder guiding means, a solder feeding roll carried by said member, means to operate said feeding means during travel of said member, and heating means to melt solder upon said articles.

13. A soldering machine comprising means to propel articles to be soldered, a reciprocative member adapted to travel with relation to said propelling means, means to move said member in opposite directions, a frame carried by said member and provided with solder guiding means, a solder feeding roll carried by said member, a ratchet connected with said feeding means, an arm having a pawl to actuate said ratchet, a cam member to operate said arm during travel of said member in opposite directions, and heating means to melt the solder over said articles.

14. A soldering machine comprising a conveyor having receivers for articles to be soldered, a reciprocative member movable with relation to said conveyor, means to reciprocate said member, a frame carried by said member and provided with guiding means for solder, means to melt solder upon said articles, means to rock said frame to present the guiding means toward and from the heating means, and means to feed solder through the guiding means.

15. A soldering machine comprising a conveyor having receivers for articles to be soldered, a reciprocative member movable with relation to said conveyor, means to reciprocate said member, a frame carried by said member and provided with guiding means for solder, means to melt solder upon said articles, means to rock said frame to present the guiding means toward and from the heating means, a solder feeding roll carried by said member, means to rotate said roll, a pressure roll cooperating with the first named roll for feeding solder, means movably carrying the pressure roll upon said frame, means to resiliently press the pressure roll toward the feeding roll, and means to retain said rolls out of cooperation.

16. A soldering machine comprising an endless conveyor provided with spaced receivers for articles to be soldered, means to operate said conveyor continuously, a reciprocative member operative adjacent to said conveyor, means to reciprocate said member, one or more gas burners carried by said member to heat said articles, a frame movably carried by said member and provided with solder guiding means, devices carried by said member to feed said solder through the guiding means, and means to rock said frame to present said guiding means toward and from the zone of the heating means over articles on the conveyor.

17. A soldering machine comprising an endless conveyor provided with spaced receivers for articles to be soldered, means to operate said conveyor continuously, a reciprocative member operative adjacent to said conveyor, means to reciprocate said member, one or more gas burners carried by said member to heat said articles, a frame movably carried by said member and provided with solder guiding means, solder feeding rolls carried by said frame to feed solder to the guiding means, a ratchet connected with one of said rolls, an arm carried by said member and provided with a pawl to cooperate with said ratchet, and a cam member cooperative with said arm to rock the latter in opposite directions according to the reciprocations of said member.

18. A soldering machine comprising a conveyor provided with spaced receivers for articles to be soldered, a reciprocative member operative with relation to said conveyor said member having a shaft, means to reciprocate said member and shaft, means to rock said shaft, a frame secured to said shaft and provided with solder guiding means, means to feed solder through said guiding means, and heating means carried by said member to travel therewith with relation to the guiding means.

19. A soldering machine comprising a conveyor provided with spaced receivers, said receivers having projections to receive caps and having seats to receive spouts and heads thereof, means to propel said conveyor, soldering devices comprising means to present solder over said spouts and caps in the receivers, heating means for the solder, and means to reciprocate the soldering devices and the heating means in the direction of travel of the conveyor and in the reverse direction.

Signed at Passaic, in the county of Passaic and State of New Jersey, this 23rd day of November, A. D. 1922.

CHARLES GUERITEY.

May 6, 1924.
I. L. HAY
1,493,036
TRAY OR TABLE ATTACHMENT
Filed May 7, 1923   2 Sheets-Sheet 1
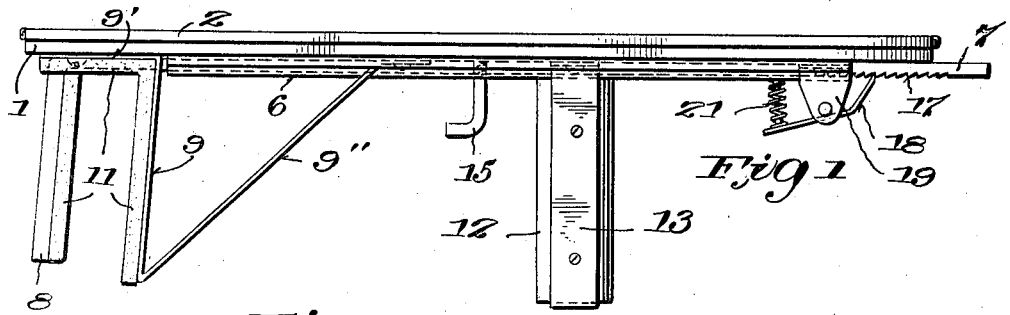
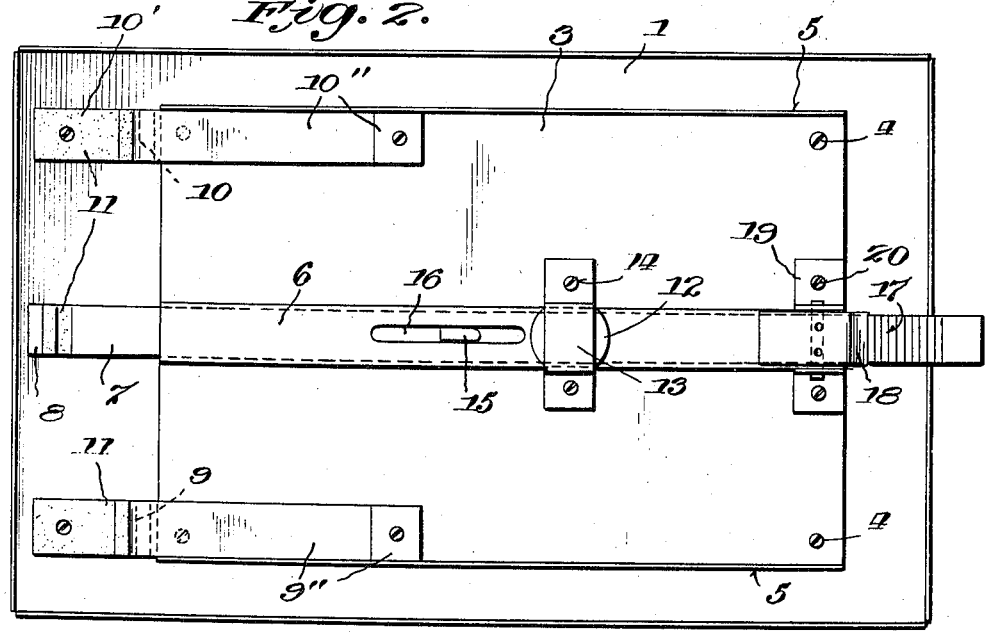
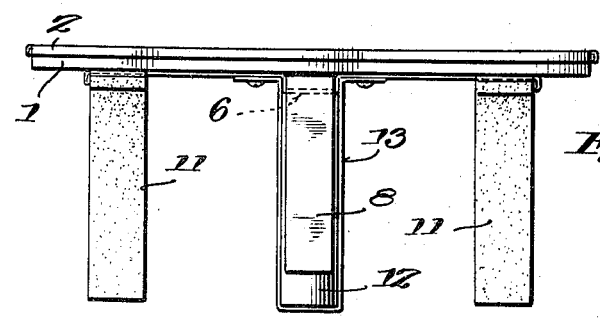
Inventor
Idus. L. Hay,
By Steward & McKay
his Attorneys